(12) United States Patent
Ratner et al.

(10) Patent No.: US 11,475,556 B2
(45) Date of Patent: Oct. 18, 2022

(54) METHOD AND APPARATUS FOR RAPIDLY CLASSIFYING DEFECTS IN SUBCOMPONENTS OF MANUFACTURED COMPONENT

(71) Applicant: Bruker Nano, Inc., Santa Barbara, CA (US)

(72) Inventors: Edward R. Ratner, Minneapolis, MN (US); Andrew George Reid, San Jose, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 60 days.

(21) Appl. No.: 16/830,108

(22) Filed: Mar. 25, 2020

(65) Prior Publication Data

US 2020/0380654 A1    Dec. 3, 2020

Related U.S. Application Data

(60) Provisional application No. 62/854,775, filed on May 30, 2019.

(51) Int. Cl.
| | | |
|---|---|---|
| *G06K 1/00* | (2006.01) | |
| *G06T 7/00* | (2017.01) | |
| *G06K 9/62* | (2022.01) | |

(52) U.S. Cl.
CPC ............ *G06T 7/001* (2013.01); *G06K 9/6269* (2013.01); *G06T 2207/20081* (2013.01); *G06T 2207/20084* (2013.01); *G06T 2207/30148* (2013.01)

(58) Field of Classification Search
CPC ........... G06T 7/001; G06T 2207/20084; G06T 2207/30148; G06T 2207/20081;
(Continued)

(56) References Cited

U.S. PATENT DOCUMENTS

| | | |
|---|---|---|
| 6,456,899 B1 | 9/2002 | Gleason et al. |
| 6,923,067 B2 | 8/2005 | Coen et al. |

(Continued)

FOREIGN PATENT DOCUMENTS

| | | |
|---|---|---|
| CN | 101785009 A | 7/2010 |
| TW | 201543592 A | 11/2015 |
| TW | 201901113 A | 1/2019 |

OTHER PUBLICATIONS

Huang, Yu-Jung et al., "Machine-Learning Approach in Detection and Classification for Defects in TSV-Based 3-D IC", IEEE Transactions On Components, Packaging and Manufacturing Technology, vol. 8, No. 4, Apr. 2018.*

(Continued)

*Primary Examiner* — Samir A Ahmed
(74) *Attorney, Agent, or Firm* — Boyle Fredrickson S.C.

(57) ABSTRACT

The present disclosure provides methods and apparatus for rapidly classifying detected defects in subcomponents of a manufactured component or device. The defect classification may occur after defect detection or, because the classification may be sufficiently rapid to be performed in real-time, during defect detection, as part of the defect detection process. In an exemplary implementation, the presently-disclosed technology may be utilized to enable real-time classification of detected defects in multiple subcomponents of the component in parallel. The component may be, for example, a multi-chip package with silicon interposers, and the subcomponents may include, for example, through-silicon vias and solder joints. Defects in subcomponents of other types of components may be also be classified. One embodiment relates to a method of classifying detected defects in subcomponents of a manufactured component. Another embodiment relates to a product manu- (Continued)

factured using a disclosed method of inspecting multiple subcomponents of a component for defects.

22 Claims, 10 Drawing Sheets

(58) Field of Classification Search
CPC ............ G06K 9/6269; G06K 2209/19; G06K 9/6256; G06K 9/6268
See application file for complete search history.

(56) References Cited

U.S. PATENT DOCUMENTS

| | | | |
|---|---|---|---|
| 7,446,865 B2 | 11/2008 | Chung et al. | |
| 7,583,832 B2 | 9/2009 | Okuda et al. | |
| 8,595,666 B2 | 11/2013 | Hayakawa et al. | |
| 8,995,748 B2 | 3/2015 | Sakai et al. | |
| 9,430,743 B2 | 8/2016 | Plihal | |
| 9,613,411 B2 | 4/2017 | Konuru et al. | |
| 10,713,534 B2 | 7/2020 | Brauer | |
| 2004/0218806 A1 | 11/2004 | Miyamoto et al. | |
| 2005/0251276 A1 | 11/2005 | Shen et al. | |
| 2006/0078188 A1 | 4/2006 | Kurihara et al. | |
| 2007/0053580 A1 | 3/2007 | Ishikawa et al. | |
| 2007/0114396 A1* | 5/2007 | Tohyama | H01L 27/105 250/307 |
| 2009/0055783 A1 | 2/2009 | Florence et al. | |
| 2011/0164130 A1 | 7/2011 | Chen et al. | |
| 2013/0069062 A1 | 3/2013 | Bhoovaraghan et al. | |
| 2014/0064445 A1 | 3/2014 | Adler et al. | |
| 2014/0270491 A1* | 9/2014 | Lu | G06K 9/4642 382/159 |
| 2015/0262038 A1 | 9/2015 | Konuru et al. | |
| 2017/0069075 A1 | 3/2017 | Okuda | |
| 2019/0236415 A1* | 8/2019 | Pyko | G06K 9/6282 |
| 2019/0294923 A1* | 9/2019 | Riley | G06K 9/6256 |
| 2020/0013145 A1* | 1/2020 | Ratner | G06T 5/50 |

OTHER PUBLICATIONS

Internal Search Report and Written Opinion of the International Searching Authority for Application No. PCT/US2020/032698, dated Jul. 28, 2020 [dated Jul. 28, 2020], 13 sheets.
Oumayma Essid, et al. "Automatic detection and classification of manufacturing defects in metal boxes using deep neural networks", Nov. 9, 2018, pp. 1-17.
Herbert Bay, et al. Speeded-Up Robust Features (SURF), Dec. 15, 2007, pp. 346-359.
Max Ferguson, et al. "Detection and Segmentation of Manufacturing Defects with Convolutional Neutral Networks and Transfer Learning", 2018, 43 pages, NIST Author Manuscript, published in Smart Sustain Manuf Syst.2018.

* cited by examiner

Procedure to generate a synthetic x-ray image of a bridge defect

METHOD AND APPARATUS FOR RAPIDLY CLASSIFYING DEFECTS IN SUBCOMPONENTS OF MANUFACTURED COMPONENT

CROSS-REFERENCE TO RELATED APPLICATION(S)

This application claims the benefit of U.S. Provisional Application No. 62/854,775, filed on May 30, 2019. The aforementioned application is hereby incorporated herein by reference in its entirety.

BACKGROUND OF THE INVENTION

1. Field of the Invention

The present disclosure relates to the inspection of manufactured components or devices using automated apparatus and methods.

2. Description of the Background Art

Integrated circuit packaging technologies have evolved and become more complex over time. Two-dimensional integrated circuit packaging has developed to accommodate increasingly dense connections and now includes, for example, dual-in-line packages, quad flat packages, pin grid arrays, and ball grid arrays.

Furthermore, three-dimensional (3D) integration is increasingly being employed in advanced packaging of integrated circuits. One example of such 3D packaging technology provides interconnections by way of an interposer between two or more semiconductor devices, a semiconductor device and a printed circuit board, or a semiconductor device and some other package component. The interposer may be a silicon wafer in which vias that pass through the silicon, and are filled with electrically conductive material, such as copper or tungsten, have been manufactured. An active silicon device may also function as an interposer.

When integrated circuits are bonded to both sides of the interposer, the through-silicon vias (TSVs) allow signals from one IC to travel a relatively short distance vertically from one integrated circuit to another. When integrated circuits are bonded to a PCB using an interposer, the TSVs allow signals from the integrated circuits on one side of the interposer to connect the PCB. Such TSVs may have an aspect ratio of 10:1 or more.

In certain advanced packaging solutions, a single interposer may serve as the interconnection between memory integrated circuits, which contain billions of memory cells, and a logic integrated circuit for a microprocessor. Such an interposer may need many thousands of TSVs. These TSVs form vital communication links between logic and memory and their proper functioning is of critical importance.

SUMMARY

The present disclosure provides methods and apparatus for rapidly classifying detected defects in subcomponents of a manufactured component or device. The defect classification may occur after defect detection or, because the classification may be sufficiently rapid to be performed in real-time, during defect detection, as part of the defect detection process.

In an exemplary implementation, the presently-disclosed technology may be utilized to enable real-time classification of detected defects in multiple subcomponents of the component. The component may be, for example, a multi-chip package with silicon interposers, and the subcomponents may include, for example, through-silicon vias and solder joints. Defects in subcomponents of other types of components may be also be classified.

One embodiment relates to a method of classifying detected defects in subcomponents of a manufactured component. Another embodiment relates to a product manufactured using a disclosed method of inspecting multiple subcomponents of a component for defects. Other embodiments, aspects and features are also disclosed.

DESCRIPTION OF THE DRAWINGS

FIGS. 5A-5E shows the exemplary generation of a synthetic x-ray image of a bridge defect in an integrated circuit packaging component in accordance with an embodiment of the invention. FIGS. 5A-5E are each composed of synthetic x-ray image pixels that are 2.75 microns in width (size).

FIG. 7 shows an example of a real x-ray image of a bridge defect of a solder joint in an integrated circuit packaging component to which methods relating to feature extraction are applied in accordance with embodiments of the invention. FIG. 7 is composed of real x-ray image pixels that are 2.75 microns in width (size).

DETAILED DESCRIPTION

Detecting and classifying defects in connections and other subcomponents within integrated circuit packages for manufacturing defects is increasingly problematic and challenging. These problems and challenges are, at least in part, due to the high-density and three-dimensional nature of advanced packaging technologies.

The present disclosure provides technology for rapidly classifying detected defects in multiple subcomponents of a component, such as, for example, a manufactured component for use in packaging integrated circuits. The disclosed technology includes methods and apparatus for the parallel, real-time defect classification in multiple subcomponents of the manufactured component. In an exemplary use of the technology, defects in TSVs of an interposer with thousands of TSVs may be classified in real-time to determine the defect types. Such real-time inspection may be used advantageously in a manufacturing line for statistical process control.

Rapid Defect Classification

Figure 1:
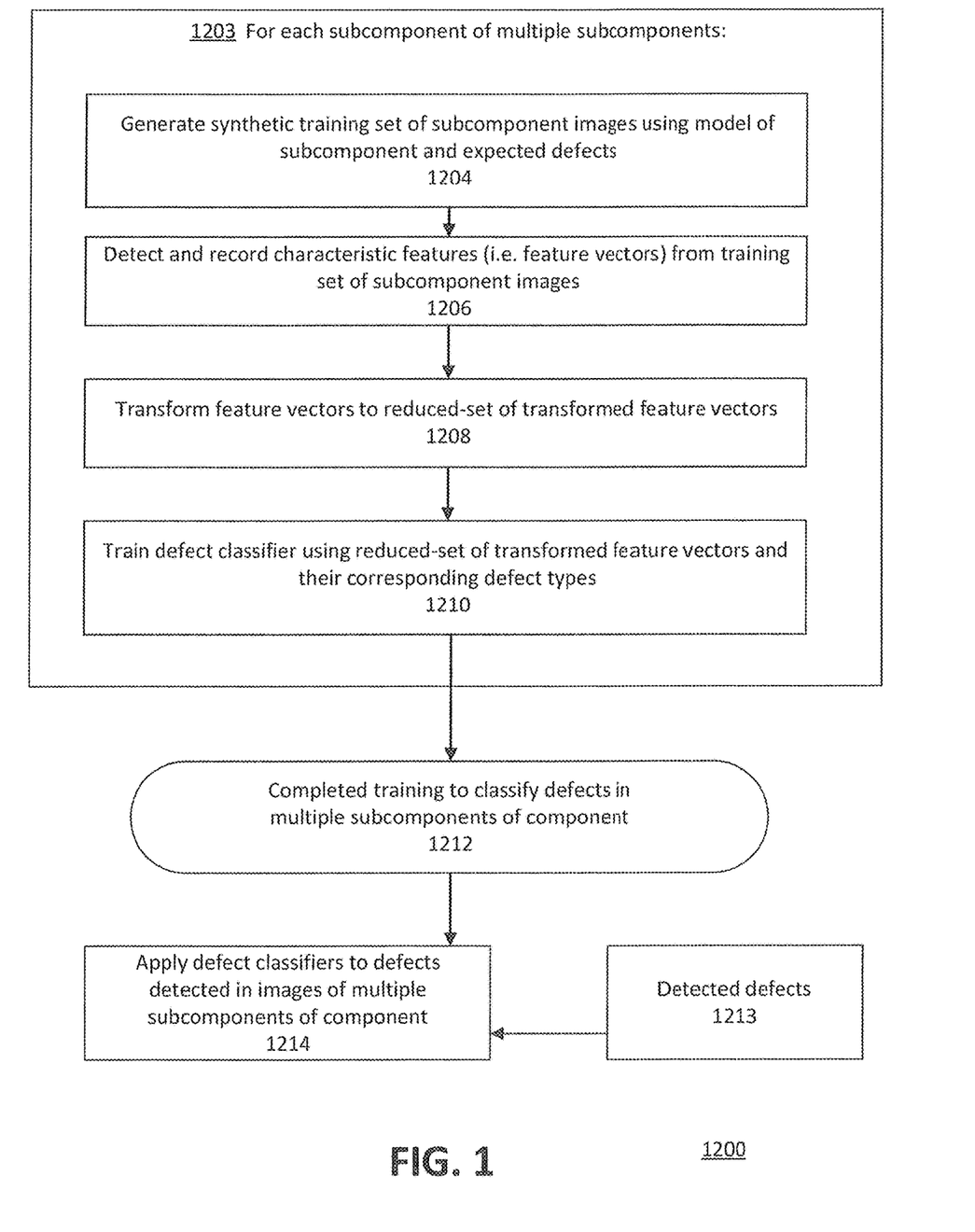
FIG. 1 is a flow chart of a method of rapidly classifying defects detected in subcomponents of a manufactured component or device in accordance with an embodiment of the invention.

FIG. 1 is a flow chart of a method 1200 of training and rapidly classifying defects detected in subcomponents of a manufactured component in accordance with an embodiment of the invention. This method 1200 may be performed to provide real-time classification of detected defects in the subcomponents of the component. The classification method 1200 may be used to classify defects that were previously detected but either remain unclassified or require further classification.

Per block 1203, for each subcomponent of the component which is to be classified, steps 1204 through 1210 may be performed so as to train a defect classifier which is specific to the subcomponent image. These steps may be performed for multiple subcomponents in parallel.

Per step 1204, a synthetic training set of subcomponent images is generated using a model for the subcomponent and expected defects for that subcomponent. This synthetic training set of subcomponent images may be generated using Monte Carlo simulation. The Monte Carlo simulation may place defects, within expected constraints, at randomized positions, randomized sizes, and randomized shapes within the modeled subcomponent before generation of the subcomponent image. The defect types may include, for example, voids which cause open circuits and contacts between conductors that cause short circuits.

Per step 1206, characteristic features are detected and recorded from the synthetic training set of subcomponent images. Standardization of the features may then be applied. In an exemplary implementation, the standardization of features involves a process of subtracting the mean and dividing by the variance on a column-wise basis of the training samples. The standardization technique applied may depend on the particular application. The feature detection obtains a set of features that may be used to characterize the subcomponent images. The number of features in the set may be reduced or limited to a manageable number of substantial features. Each subcomponent image may then be described by its feature vector.

In an exemplary implementation, the detection of characteristic features may be performed using SURF feature detection, described in "Speeded-Up Robust Features: SURF" by Herbert Bay et al. in ECCV 2006, Part I, LNCS 3951, pp. 404-417, Springer-Verlag Berlin Heidelberg 2006. Advantageously, SURF feature detection is rotationally invariant. In another implementation, the detection of characteristic features may be performed using Haar filters so as to obtain Haar wavelet features. In another implementation, the detection of characteristic features may be performed by extracting Hu moments. In another implementation, the detection of characteristic features may be performed by using a histogram of oriented gradients (HoG).

Per step 1208, a transformation may be applied to the feature vectors (obtained per step 1206) to produce a set of transformed feature vectors. The set of transformed feature vectors may be considered, in at least some cases, to be a set of approximately uncorrelated feature vectors that spans the feature space.

Note that, in accordance with an embodiment of the invention, the transformation applied may be a principal component analysis (PCA) transformation. The PCA transformation may result in a transformed feature space with reduced feature-dimensionality compared with the feature space before transformation. As an example, a Haar feature set may generate 256 features per sample, and a PCA transform may reduce that feature set to only the top 25 components, reducing the dimensionality from 256×N to 25×N (where N is the number of training samples). This reduced feature-dimensionality advantageously reduces the amount of processing required and so speeds up the defect classification.

Figure 2A:
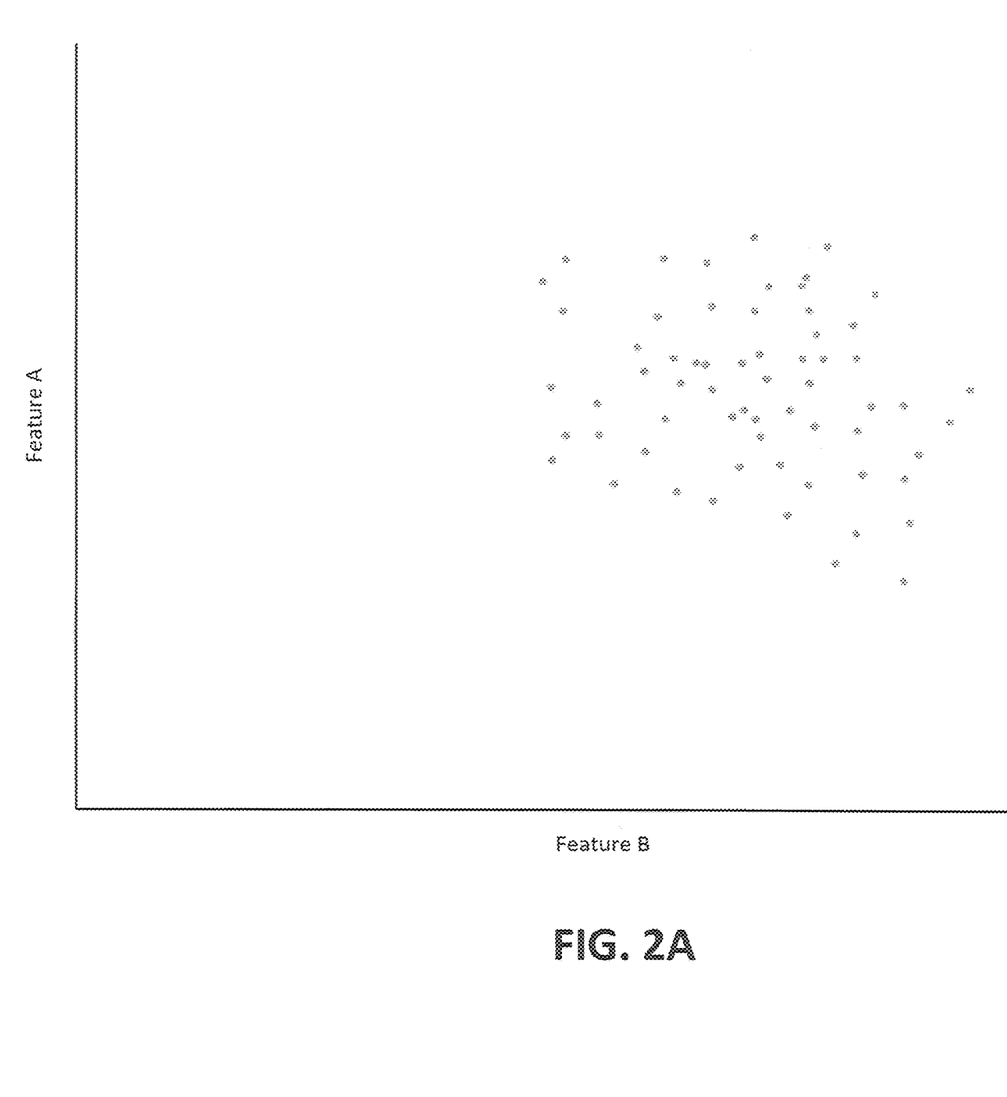
FIG. 2A depicts extracted characteristic feature vectors showing two feature-dimensions of a multi-dimensional feature space for a hypothetical training set in accordance with an embodiment of the invention.
Figure 2B:
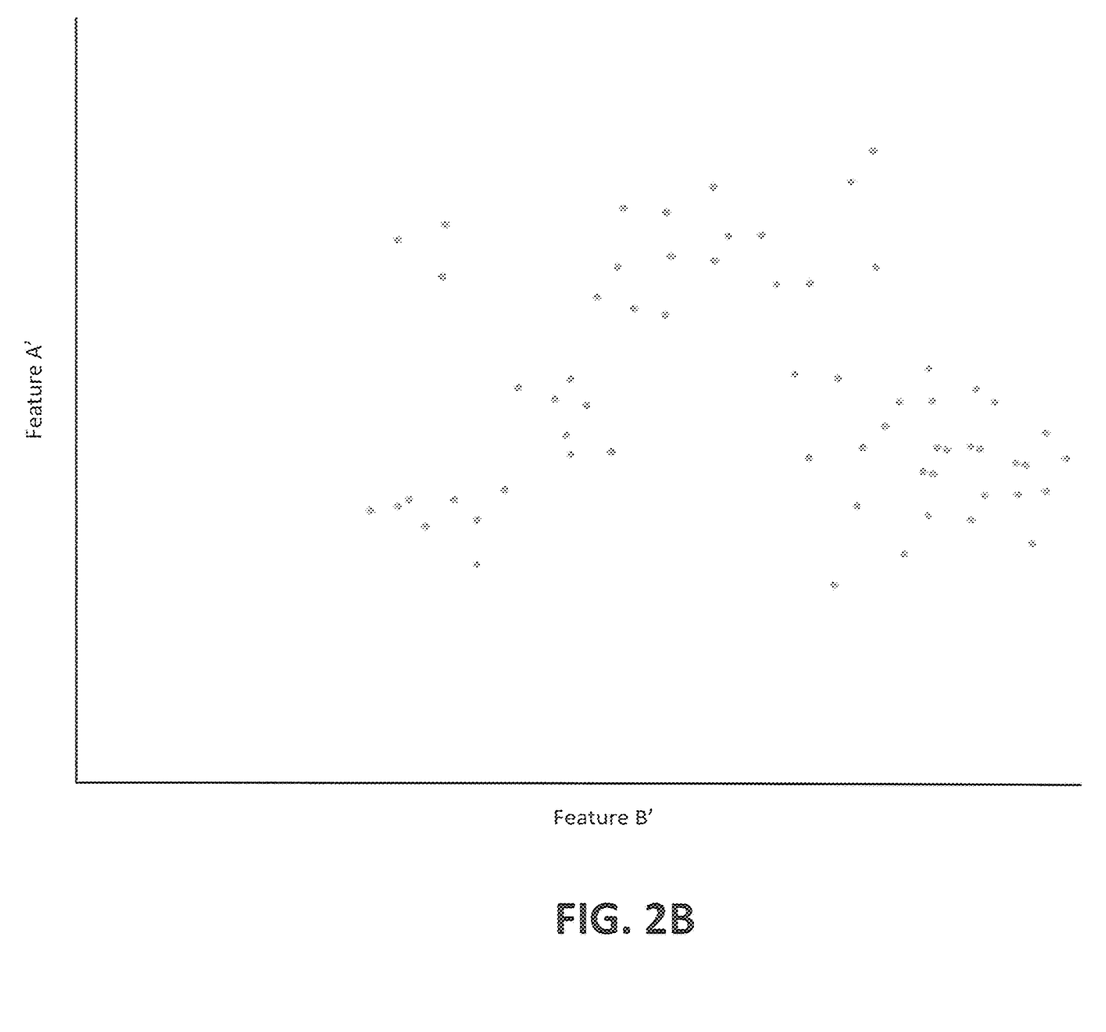
FIG. 2B depicts two feature-dimensions of transformed feature vectors for the hypothetical training set after transformation to an approximately uncorrelated, orthogonal, multi-dimensional feature space in accordance with an embodiment of the invention.

Detected feature vectors (obtained per step 1206) of a hypothetical training set of defects in a subcomponent is illustrated in FIG. 2A, where the depiction of the multi-dimensional feature space is simplified to show two-dimensions with Features A and B for ease of illustration. Each dot in FIG. 2A represents the feature vector for a subcomponent image from a training set of subcomponent images. Two dimensions of feature vectors for the hypothetical training set after transformation (transformed per step 1208) are depicted in FIG. 2B, where Features A' and B' are two dimensions of the transformed feature space.

Advantageously, because the feature vectors have been transformed into a transformed feature space (per steps 1208) before being used to train the defect classifier, the capability and accuracy of the defect classifier (trained in step 1210 and applied in step 1214) are improved. This is shown by the feature vectors (dots) in FIG. 2B being better separated into groups compared to the feature vectors (dots) in FIG. 2A. Hence, the groupings of feature vectors in FIG. 2B may be more readily associated with defect classes by the defect classifier.

Per step 1210, the transformed feature vectors, along with the corresponding defect types, of the synthetic training set are used to train the deflect classifier for the subcomponent. The defect classifier may be, for example, an artificial neural network. Other types of classification models besides artificial neural networks may also be used. One example of a different type of classification model that may be used is a support vector machine. Another type of classification model is a decision-tree based classification model. Decision-tree based classification models include, for example, the Random Forest model and the Gradient Boosting Machine model.

Per step 1212, the defect classifier for each subcomponent is done. At this point, the training of the defect classifiers are complete, and the classifiers are ready to classify defects in the multiple subcomponents of the component.

Per step 1214, the defect classifiers for the multiple subcomponents may be applied to defects detected (per step 1213) in images of those subcomponents. In this way, the defects in the multiple subcomponents may be advantageously classified in parallel in real-time as part of a manufacturing process.

Figure 7:
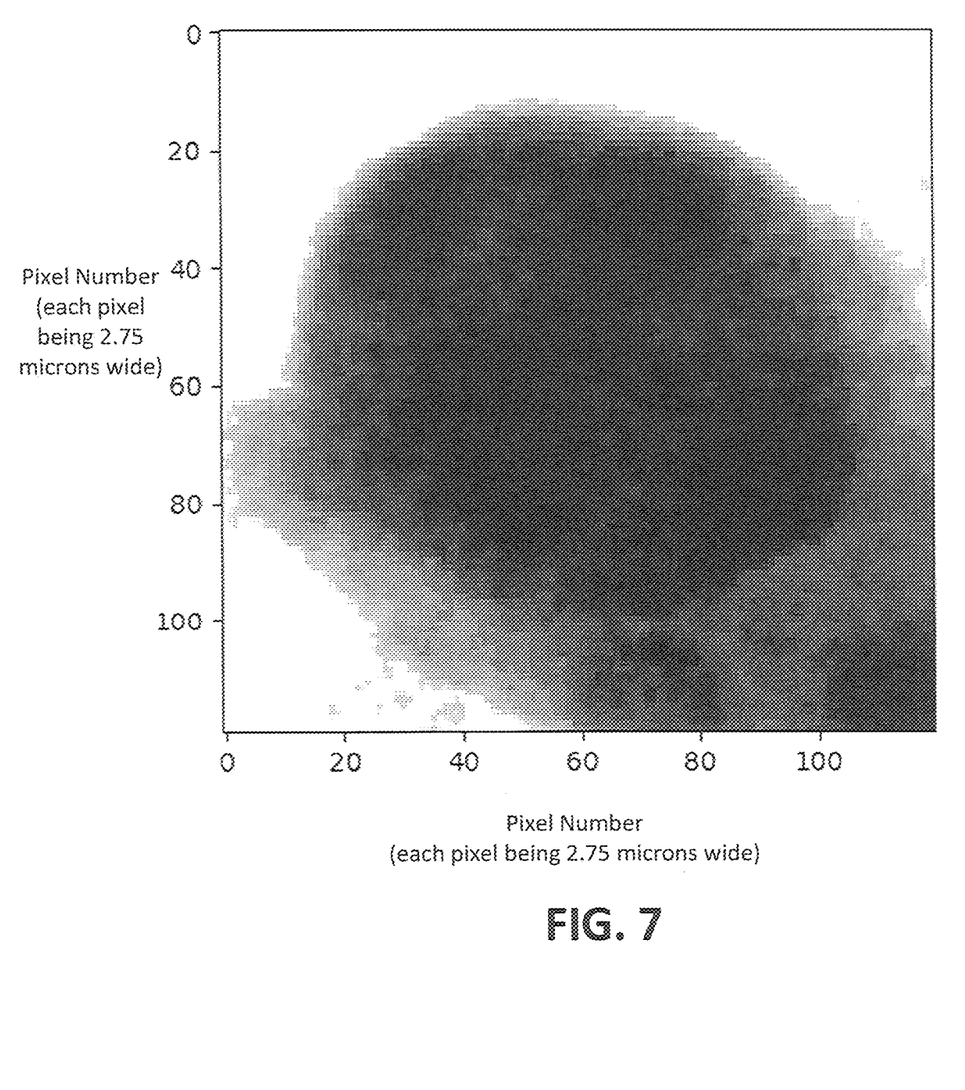

Examples of defect classifiers applied to a real x-ray image of a subcomponent are now described. The real x-ray image is that of a bridge defect and is shown in FIG. 7, which is composed of real x-ray image pixels that are 2.75 microns in width. As used herein, the term "bridge defect" refers to a solder short between two nearby solder joints of an integrated circuit packaging component. For example, the bridge defect may be between nearby solder joints for pins of pin grid array (PGA) package. As another example, the bridge defect may be between nearby solder joints for balls of a ball grid array (BGA) package. Similarly, a bridge defect may be in other types of integrated circuit packaging.

As a first example, Hu-moment features are extracted from the real x-ray image of the bridge defect shown in FIG. 7. Appendix A provides the raw Hu-moment features, the standardized Hu-moment features, and the standardized Hu-moment features after PCA transformation.

As a second example, Haar-wavelet features are extracted from the real x-ray image of the bridge defect shown in FIG. 7. Appendix B provides the raw Haar-wavelet features, the standardized Haar-wavelet features, and the standardized Haar-wavelet features after PCA transformation.

As a third example, Histogram of Oriented Gradients (HoG) features are extracted from the real x-ray image of the bridge defect shown in FIG. 7. Appendix C provides the raw HoG features, the standardized HoG features, and the standardized HoG features after PCA transformation.

Exemplary Implementation in a High-Speed X-Ray Imaging System

The presently-disclosed technology enables real-time classification of detected defects for a multitude of subcomponents within a component being manufactured. In one implementation, the presently-disclosed technology may be implemented in conjunction with a high-speed x-ray imager, such as that disclosed by Adler et al. in U.S. Pat. No. 9,129,715, or an instrument with a conventional x-ray microscope geometry.

In U.S. Pat. No. 9,129,715, issued Sep. 8, 2015, Adler et al. discloses an innovative x-ray microscope with a high flux x-ray source that allows high speed metrology or inspection of objects such as integrated circuits (ICs), printed circuit boards (PCBs), and other IC packaging technologies. The object to be investigated is illuminated by collimated, high-flux x-rays from an extended source having a designated x-ray spectrum. The system also comprises a stage to control the position and orientation of the object; a scintillator that absorbs x-rays and emits visible photons positioned in very close proximity to (or in contact with) the object; an optical imaging system that forms a highly magnified, high-resolution image of the photons emitted by the scintillator; and a detector such as a CCD array to convert the image to electronic signals.

Figure 3:
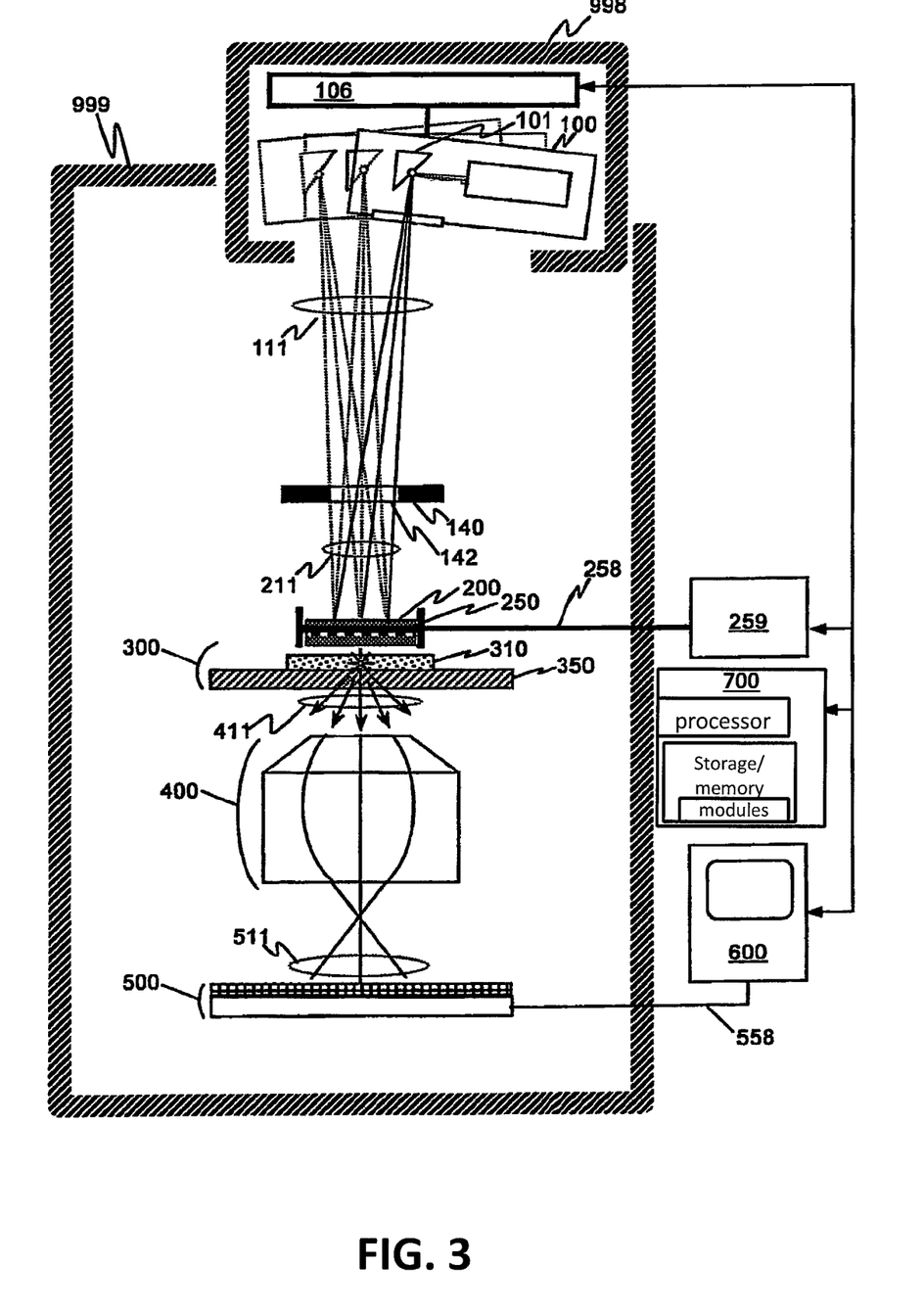
FIG. 3 illustrates an overview in cross-section of a high-speed x-ray imaging system in accordance with an embodiment of the invention.

FIG. 3 illustrates an overview in cross-section of an embodiment of a high-speed x-ray imaging system in accordance with a preferred embodiment of the invention. An x-ray emitter 101 emits x-rays 111. These x-rays are then shaped into a collimated x-ray beam 211, in some embodiments using distance from the emitter 101 and a plate 140 with an aperture 142. This collimated x-ray beam 211 then illuminates an object 200 to be examined. The x-rays that are transmitted through the object 200 illuminate a scintillator assembly 300 comprising a scintillator 310 and, in some embodiments, a support 350 for the scintillator. The scintillator 310 absorbs a portion of the x-rays and releases some of the energy so absorbed with the emission of visible photons 411.

Using an optical system 400, a magnified image 511 of the visible photons 411 emitted by the scintillator is formed on an image detector 500. The image detector 500 converts the intensity of the magnified image 511 to an electronic signal. The image detector 500 can comprise an electronic sensor, such as a charge-coupled device (CCD), or another image sensor known to those skilled in the art. The electronic signal is transmitted through a connector 558 to a system of electronics and processing 600 that, in some embodiments, can display the image results, and in some embodiments can store the image results and/or perform image processing algorithms on the image results in conjunction with one or more computer systems 700.

For any source emitting ionizing radiation such as x-rays, it is often wise to provide shielding 998 around the x-ray source 100, and in some situations legally required for operation. Such shielding 998 can be a simple enclosure of shaped sheets of lead metal, or a more intricate design fabricated from any of a number of x-ray absorbing materials, such as lead-doped glass or plastic, that will be known to those skilled in the art. Shielding is desirable to keep random x-rays, either directly from the emitter 101 or reflected from some other surface, from causing unwanted effects, particularly spurious signals in the various electronic components used to control the system.

Likewise, for some embodiments, additional shielding 999 around the beam path may also be desired, and in some cases be legally required for operation. Such additional shielding 999 can be a simple enclosure of shaped sheets of lead metal, or a more intricate design fabricated from any of a number of x-ray absorbing materials such as lead-doped glass or plastic, that will be known to those skilled in the art. Additional shielding 999 is desirable to keep random x-rays, either directly from the emitter 101 or reflected from some other surface, from causing unwanted effects, particularly spurious signals in the various electronic components used to control the system.

Because certain image detectors 500 such as those comprising CCD sensors can be particularly sensitive to x-ray exposure, in some embodiments a portion of the scintillator assembly 300 may also be fabricated in whole or in part using a material, such as a lead-doped glass, which absorbs x-rays while transmitting the visible photons 411 emitted by the scintillator.

The apparatus for the x-ray source may include a mount 106 that can move the position of the x-ray source 100 relative to the object 200, thereby changing the angle of incidence of the x-ray beam on the object. The mount 106 can be designed to allow the x-ray source 100 to swing in the x-z plane, in the y-z plane, or any other combination of axes. The source can also be moved along the z-axis to move the x-ray source 100 closer to the object 200. This may have the effect of making the beam brighter, increasing signal strength, at the cost of having an x-ray beam that is less collimated, reducing resolution. This effect may be reduced or eliminated by reducing the spot size of the x-ray source.

Motion of the x-ray source 100 using the mount 106 may be controlled by the computer system 700 several ways. In some embodiments, the source mount 106 may move the x-ray source 100 to a fixed location to allow an image to be captured. In some embodiments, the mount 106 can move the x-ray source 100 continuously as images are gathered, allowing the dynamic change of x-ray intensity as transmitted through the object 200 to be recorded as a function of illumination angle. In some embodiments, the x-ray emitter 101 may be moved to at least 10 degrees off the normal incidence angle.

In some embodiments, further adjustment of the angle of incidence of the x-ray beam 211 on the object 200 may be achieved by coordinating the motion of the x-ray source 100 using the source mount 106 with the motion of the object 200 using the object mount 250. In some embodiments, the motion of the mount 250 is controlled by a controller 259 through a connector 258. The controller 259 is in turn directed either by direct input from an operator, or by electronic instructions provided by the computer system 700.

In some embodiments, the shielding 998 will be designed to enclose the x-ray source 100 and the source mount 106. In other embodiments, the shielding 998 can be designed to only enclose the x-ray source, with the mount 106 designed to move the shielding 998 as it moves the x-ray source 100.

In some embodiments of the invention, multiple x-ray sources may be used to produce images with different angles of incidence. The x-ray sources may be fixed in space or moveable, and they may be operated sequentially or simultaneously. The x-ray sources may be operated manually or controlled by one or more computer systems 700.

In accordance with an embodiment of the invention, the computer system 700 include one or more processors, data storage, and data memory, among other components. The computer system 700 may include, in data storage and/or data memory, software modules with executable instructions for classifying detected defects in subcomponents in accordance with the methods disclosed herein.

Figure 4:
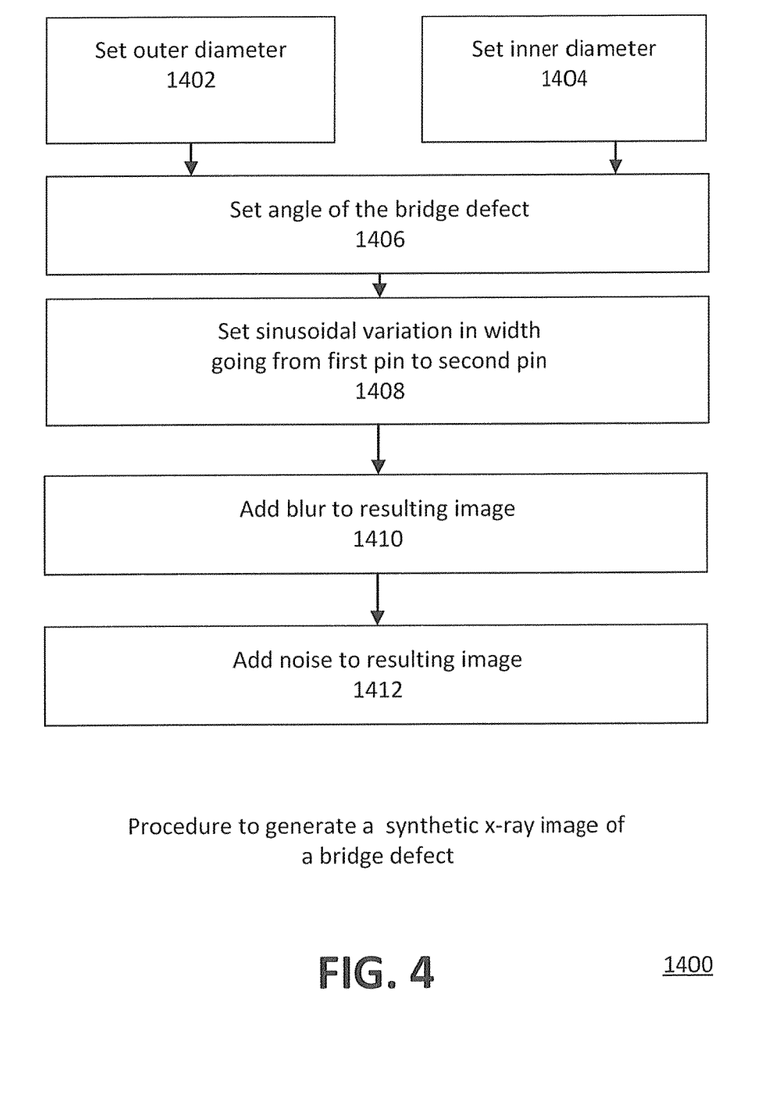
FIG. 4 is a flow chart of an exemplary method 400 of generating a synthetic x-ray image of a bridge defect in accordance with an embodiment of the invention.

FIG. 4 is a flow chart of an exemplary method 1400 of generating a synthetic x-ray image of a bridge defect in accordance with an embodiment of the invention. The method 1400 may be applied a multitude of times using a Monte Carlo type procedure so as to generate a large number of synthetic x-ray images as a training set, in accordance with step 1204 in FIG. 1.

As used herein, the term "bridge defect" refers to a solder short between two nearby solder joints of an integrated circuit packaging component. For example, the bridge defect may be between nearby solder joints for pins of pin grid array (PGA) package. As another example, the bridge defect may be between nearby solder joints for balls of a ball grid array (BGA) package. Similarly, a bridge defect may be in other types of integrated circuit packaging.

Figure 5A:
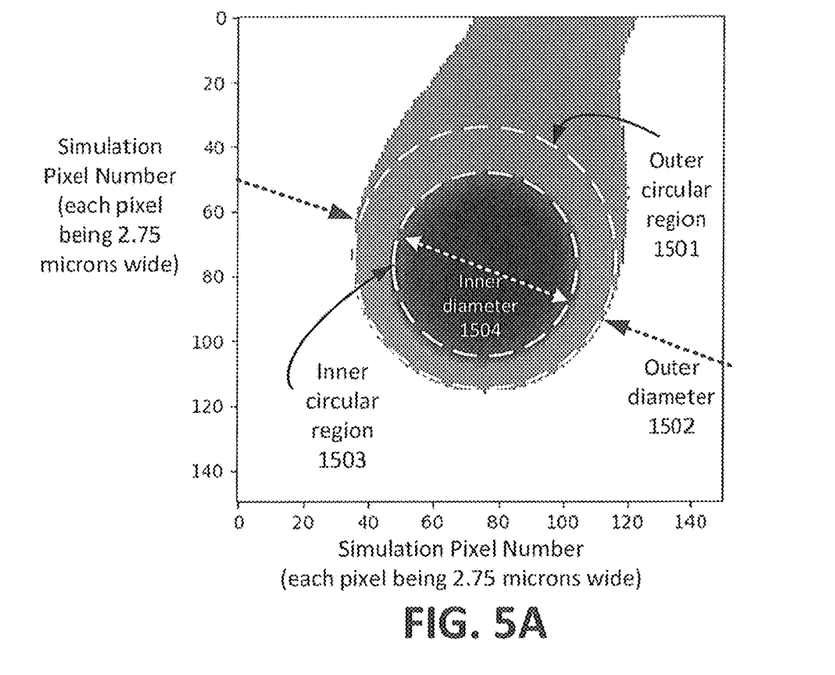

Per step 1402, an outer circular region of a bridge defect may be set with a diameter ("outer bridge diameter") having a random variation about a first nominal dimension. An example showing such an outer circular region 1501 and an outer diameter 1502 for the synthetic image of a bridge defect is depicted in FIG. 5A, which is composed of synthetic x-ray image pixels that are 2.75 microns in width. The first nominal dimension may be the average dimension expected such an outer circular region 1501 in an x-ray image of the component to be inspected. The random variation is expected to be relatively smaller than the nominal dimension and may be made to correspond to an expected variation in that image feature. The random variation is included so as to generate a training set of synthetic x-ray images that includes various outer circular regions 1501.

Per step 1404, an inner circular region of a bridge defect may be set with a diameter ("inner bridge diameter") having a random variation about a nominal dimension and with random eccentricity. Here, the eccentricity refers to an angle and a distance (i.e. a displacement vector) between the center of the outer circular region 1501 and the center of the inner circular region 1503. An example showing such an inner circular region 1503 and an inner diameter 1504 for the synthetic image of a bridge defect is shown in FIG. 5A. As shown, the inner diameter 1504 is a diameter of an inner (darker shaded) circular region 1503 at the location of the solder joint, while the outer diameter 1502 is a diameter of an outer (lighter shaded) circular region 1501 of the image around the inner circular region 1503.

Figure 5B:
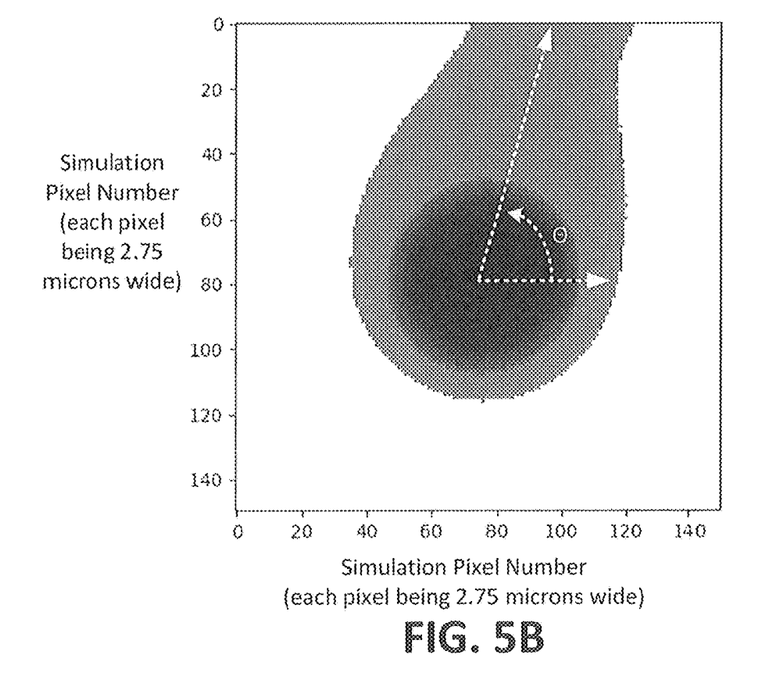

Per step 1406, an angle of the bridge may be randomly selected between 0 and 360 degrees. An example showing such an angle Θ for the synthetic x-ray image of a bridge defect is shown in FIG. 5B. The angle Θ may be randomly chosen so as to generate a training set of synthetic x-ray images that includes various angles within the range of 0 and 360 degrees.

Figure 5C:
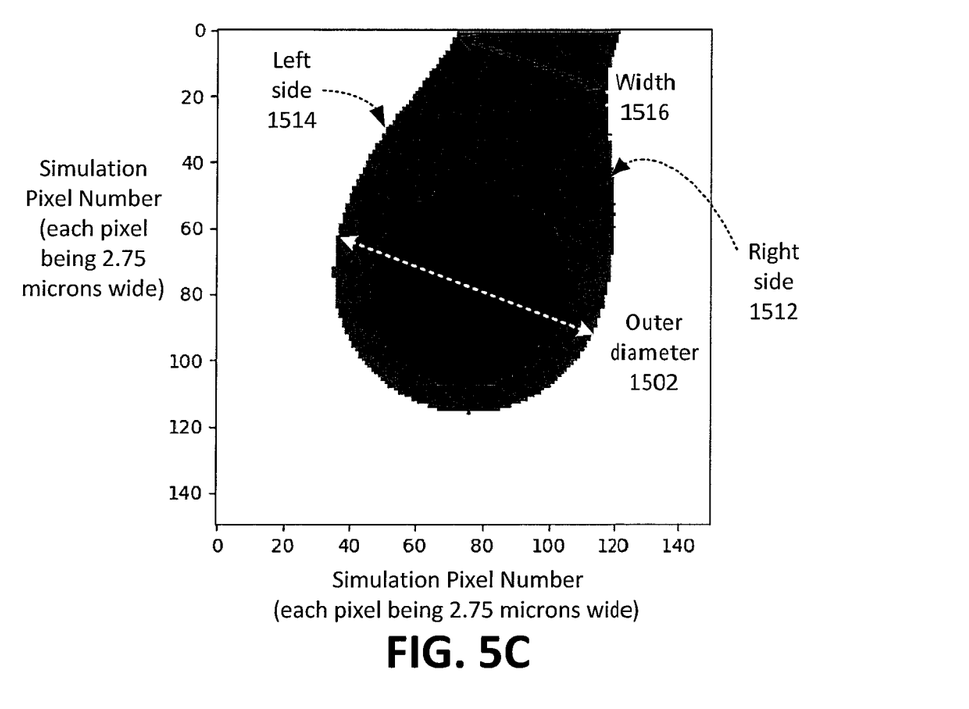

Per step 1408, a sinusoidal variation in the width 1516 is set going from the outer diameter 1502 at the first solder joint at the defined angle towards the second solder joint (not shown). An example showing such sinusoidal variation for the synthetic x-ray image of a bridge defect is shown in FIG. 5C. As further shown, the sinusoidal variation may be applied to the right side 1512 and the left side 1514 so as to narrow or "squeeze" the width 1516 as it gets further away from a solder joint such that a "bridge" is formed between the two solder joints.

Figure 5D:
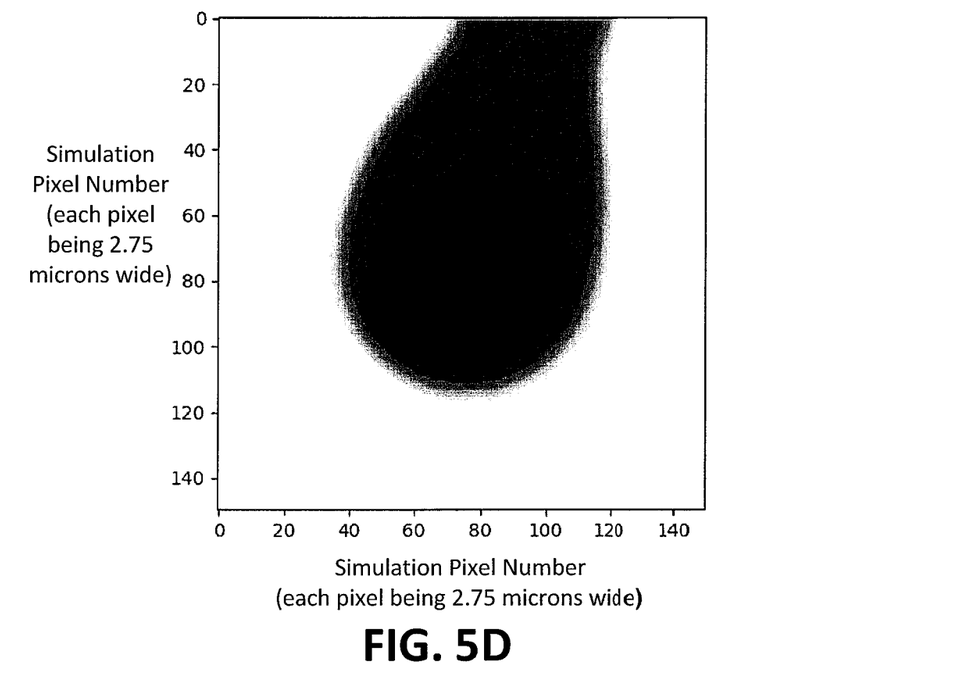

Per step 1410, blur may be added to the resulting image. In an exemplary implementation, the blur may be Gaussian blur so as to simulate a detector response. An example showing the addition of Gaussian blur noise to the synthetic x-ray image of a bridge defect is shown in FIG. 5D.

Figure 5E:
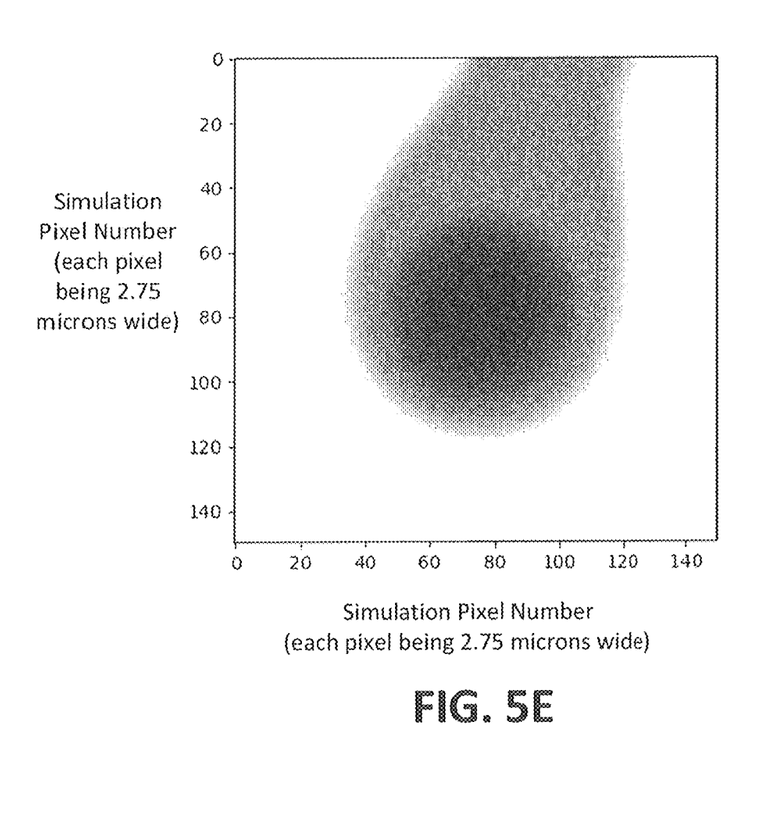

Per step 1412, noise may be added to the resulting image. In an exemplary implementation, the noise may be Gaussian noise so as to simulate a detector response. An example showing the addition of Gaussian noise to the synthetic x-ray image of a bridge defect is shown in FIG. 5E.

Figure 6:
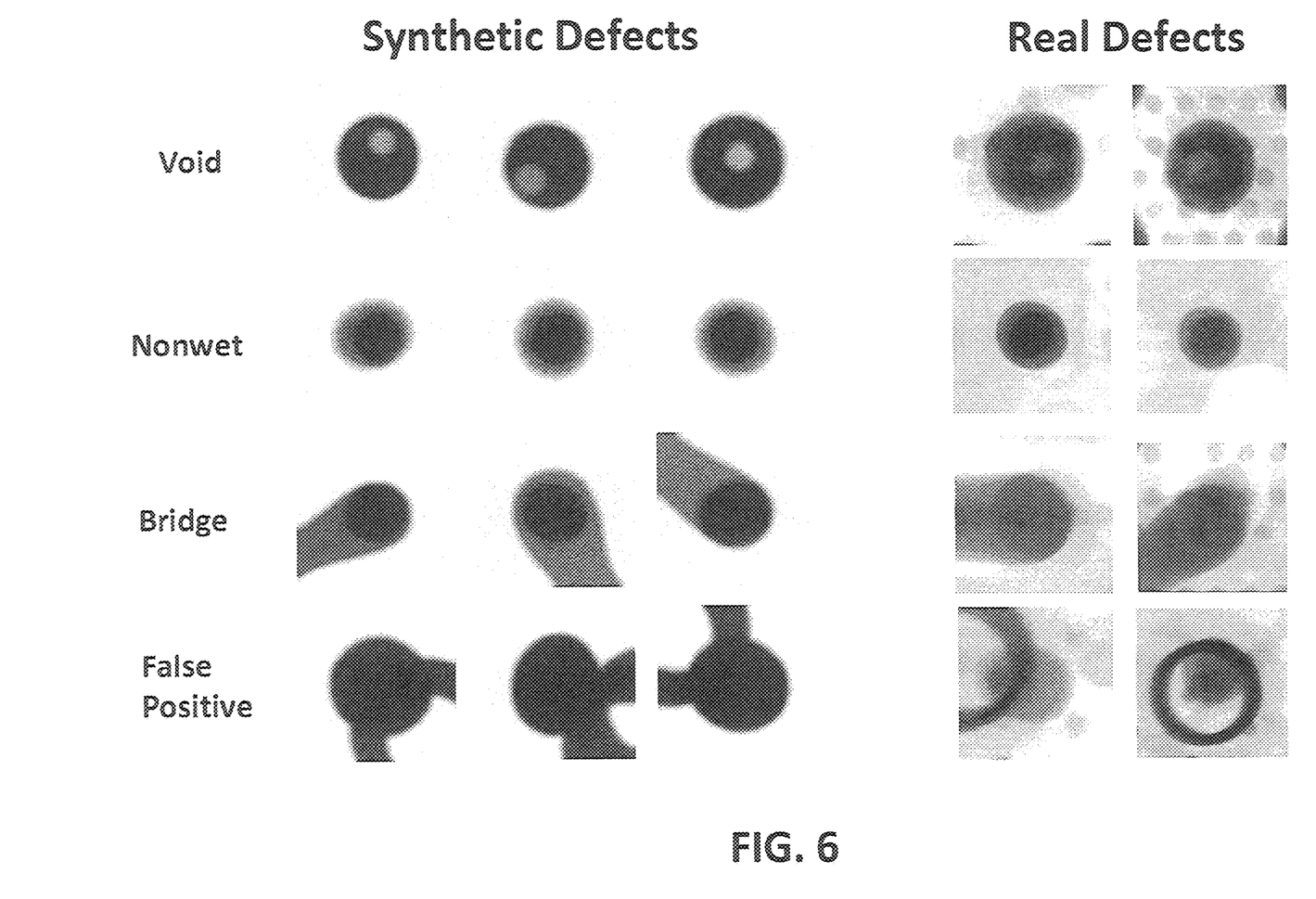
FIG. 6 shows examples of synthetic x-ray images and real x-ray images for different types of defects (including false positive defects) in an integrated circuit packaging component in accordance with an embodiment of the invention.

FIG. 6 shows examples of synthetic x-ray images and real x-ray images for different types of defects (including false positive defects) in an integrated circuit packaging component in accordance with an embodiment of the invention. Each row relates to a different type of defect.

The first row shows example synthetic x-ray images and example real x-ray images of a void defect in a solder joint. As shown, the position of the void ("Void") defect (lighter shaded region) varies within the solder joint (darker shaded surrounding region) in the example synthetic x-ray images. Relative to the center of the solder joint, the void may be at various angles and various radii in accordance with an embodiment of the invention. Similar variation in the position of the void defect (lighter shaded region) within the solder joint (darker shaded surrounding region) is seen in the example real x-ray images.

The second row shows example synthetic x-ray images and example real x-ray images of a non-wet open ("Non-wet") defect of a solder joint. As shown, a synthetic x-ray image of a non-wet open defect has a darker inner region surrounded by a lighter outer region. The shapes, sizes and positions of these regions may vary in accordance with an embodiment of the invention. Similar variation in the shapes, sizes and positions of these regions is seen in the example real x-ray images.

The third row shows example synthetic x-ray images and example real x-ray images of a bridge ("Bridge") defect of a solder joint. Generation of a synthetic x-ray image for such a bridge defect is described above in relation to FIG. 4 and FIGS. 5A-5E.

Finally, the fourth row shows example synthetic x-ray images and example real x-ray images of a false-positive ("False Positive") defect of a solder joint. The synthetic x-ray images for this false-positive class of defect correspond to real x-ray images which would otherwise often trick the defect detection procedure into detecting a false-positive defect. As shown, a synthetic x-ray image of a false-positive defect may have a dark arc or circular region overlapping with the region of the solder joint. The position and dimensions of the dark arc or circular region may vary in accordance with an embodiment of the invention. Similar variation in the position and dimensions of these regions is seen in the example real x-ray images.

Conclusion

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure.

APPENDIX A

Hu Moment Features

Raw features: [3.14328393 7.06604191 10.75016747 11.41256977 22.49603348 14.94920188 −23.5027598]

Standardized features: [−0.53318488 −0.31819097 −0.08897692 −1.73392107 0.18476844 0.18323309 −1.05591272]

PCA-Transformed Features: [1.24788744 −1.23553482 0.18079815 1.00908959 0.66650515]

APPENDIX B

Haar Wavelet Features

Raw features: [2.93435906e+05 1.66203563e+05 2.05759844e+05 3.14910063e+05
1.62897656e+05 8.22456250e+03 1.70358438e+04 1.41939875e+05
1.49258938e+05 1.63750625e+04 1.02781250e+04 5.61136250e+04
3.01576938e+05 1.51447719e+05 5.17933125e+04 2.78960000e+04
2.65640938e+04 1.27273250e+05 1.07436594e+05 5.08993750e+03
1.05114688e+04 3.89150000e+03 5.18531250e+02 4.55443750e+04
−4.81350625e+04 −1.38077500e+04 −4.69806250e+03 −1.88125000e+01
−9.79518750e+03 −4.64344063e+04 −4.76731250e+03 1.04002500e+04
2.65640938e+04 1.09151875e+04 −3.29324062e+04 −2.02543750e+03
1.20357844e+05 2.72912500e+03 −1.04064688e+04 −5.33921250e+04
6.40315000e+04 7.80487500e+03 1.95193750e+03 −1.82297500e+04
1.84230625e+04 4.98295938e+04 −9.33975000e+03 9.67125000e+03
−2.65640938e+04 1.70987500e+03 2.61288438e+04 2.02543750e+03
1.13147813e+04 8.79937500e+02 −5.08953125e+03 −1.54791250e+04
−4.82762500e+03 −6.09931250e+03 2.78137500e+03 −1.11291875e+04
9.79518750e+03 −1.86615313e+04 −3.31687500e+03 −1.06150000e+03]

Standardized features: [0.87006186 0.66900659 1.25152468 0.98145753 0.8436835 0.06371535
0.6437511 0.16926711 0.34896445 0.34962943 −0.45556852 −0.96005416
0.84187941 0.14607257 −1.25278763 −1.62527229 −0.0064092 1.82772299
1.38738134 −0.67485078 −0.27139797 −0.04610001 −0.51904878 1.04573775
−1.37722378 −0.69685576 0.54601334 0.53591319 0.49751266 0.21454218
1.36455096 1.88790627 0.07431729 −0.26847317 −0.75203094 0.98114472
1.51728587 −0.21444256 −0.58670486 −0.15267357 0.21949246 0.68645883
0.82440775 0.96042809 −0.17717588 1.58532597 0.41385095 1.66222564
−0.5114999 0.14715701 0.87556848 −0.72537654 0.97262151 −0.38456128
−0.27619464 −0.69238339 −0.26881351 −0.7345537 −0.29048343 −0.33084708
−0.23272941 −1.50844119 −0.02226293 0.93648942]

PCA Transformed Features: [1.58174837 0.28292373 3.17669827 3.88559348 −3.02797671 −0.74494311 1.33459835 0.37467086 1.47683816 0.24440247]

APPENDIX C

Histogram of Oriented Gradients

Raw features: [0.36222847 0.36222847 0.36222847 0.28554118 0.36222847 0.36222847
0.36222847 0.36222847 0.35967456 0.34762926 0.2727252 0.34526402
0.39318157 0.39318157 0.39318157 0.30401741 0.40166936 0.40166936
0.40166936 0.16558522 0.40166936 0.40166936 0.40166936 0.06746774
0.35355339 0.35355339 0.35355339 0.35355339 0.35355339 0.35355339
0.35355339 0.35355339]

Standardized features: [−0.2505845 −0.77648044 −0.77648044 −0.21926073 −0.6398331 0.38377703
0.72861962 1.18678489 −0.21116755 0.32099213 −0.56476674 0.25605038
0.36116854 0.27493585 0.29103731 0.19869448 0.30984547 0.62124834
0.80769758 −0.52036542 −0.01248327 −0.01248327 0.28674745 −1.58985066
−1.03843419 −1.22593903 −0.70697469 0.06845308 −1.06464993 0.23904948
0.66385488 1.75954143]

PCA Transformed Features: [−2.83881597 −0.1499109 −1.15626181 −2.05703739 −0.82443568 −0.12173823 −0.10296421 0.59802817 0.07482459 −0.28208322]

What is claimed is:

1. A method for classifying defects in multiple subcomponents of a component using a high-speed x-ray imaging system, the method comprising, for each subcomponent:
   generating a synthetic training set of subcomponent x-ray images using a model of the subcomponent and one or more defect types;
   computing feature vectors from the subcomponent x-ray images in the synthetic training set;
   transforming the feature vectors to obtain transformed feature vectors;
   training a defect classifier using the transformed feature vectors and their corresponding defect types; and
   classifying defects in measured high-speed x-ray images using the defect classifier.

2. The method of claim 1 further comprising:
   applying the trained defect classifier to defects detected in x-ray images of multiple subcomponents of the component.

3. The method of claim 2, wherein the defects in the multiple subcomponents are classified in parallel as part of a manufacturing process.

4. The method of claim 2, wherein the defects in the multiple subcomponents are classified in real-time as part of a manufacturing process.

5. The method of claim 1, wherein the component comprises a semiconductor package.

6. The method of claim 5, wherein the subcomponent comprises a through-silicon via or a solder joint.

7. The method of claim 1, wherein said generating utilizes randomization of defect location and size.

8. The method of claim 7, wherein said generating further utilizes randomization of defect shape.

9. The method of claim 1, wherein transforming the feature vectors comprises:
standardizing the feature vectors; and
applying a transformation to transform the feature vectors to a set of transformed feature vectors.

10. The method of claim 1, wherein the defect classifier comprises a decision-tree based classifier.

11. The method of claim 1, wherein the defect classifier uses one or more of Hu-moment features, Haar-wavelet features, and Histogram of Oriented Gradients.

12. An apparatus for classifying defects in multiple subcomponents of a component using a high-speed x-ray imaging system, the apparatus comprising:
at least one processor for executing computer-readable code; and
memory for storing and accessing computer-readable code and data;
computer-readable code for generating a synthetic training set of subcomponent x-ray images using a model of the subcomponent and one or more defect types;
computer-readable code for computing feature vectors from the subcomponent x-ray images in the synthetic training set;
computer-readable code for transforming the feature vectors to obtain transformed feature vectors;
computer-readable code for training a defect classifier using the transformed feature vectors and their corresponding defect types; and
computer-readable code for classifying defects in measured high-speed x-ray images using the defect classifier.

13. The apparatus of claim 12, wherein the method further comprises:
applying the trained defect classifier to defects detected in images of multiple subcomponents of the component.

14. The apparatus of claim 13, wherein the defects in the multiple subcomponents are classified in parallel as part of a manufacturing process.

15. The apparatus of claim 13, wherein the method further comprises:
applying the trained defect classifier to defects detected in images of multiple subcomponents of the component.

16. The apparatus of claim 12, wherein the component comprises a semiconductor package.

17. The apparatus of claim 16, wherein the subcomponent comprises a through-silicon via or a solder joint.

18. The apparatus of claim 12, wherein said generating utilizes randomization of defect location and defect size.

19. The apparatus of claim 18, wherein said generating further utilizes randomization of defect shape.

20. The apparatus of claim 12, wherein transforming the feature vectors comprises:
standardizing the feature vectors; and
applying a transformation to transform the feature vectors to a set of transformed feature vectors.

21. The apparatus of claim 12, wherein the defect classifier comprises a decision-tree based classifier.

22. The apparatus of claim 12, wherein the defect classifier uses one or more of Hu-moment features, Haar-wavelet features, and Histogram of Oriented Gradients.

* * * * *